March 30, 1937.    G. M. BARROW    2,075,082
COTTER DEVICE
Filed Sept. 18, 1934
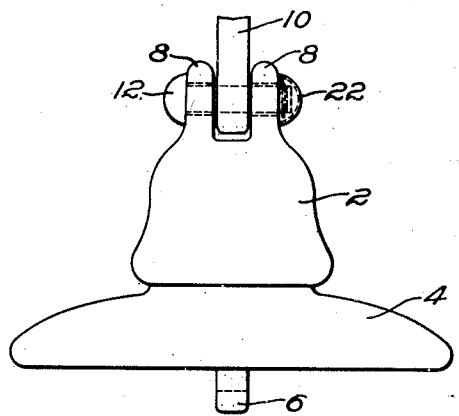
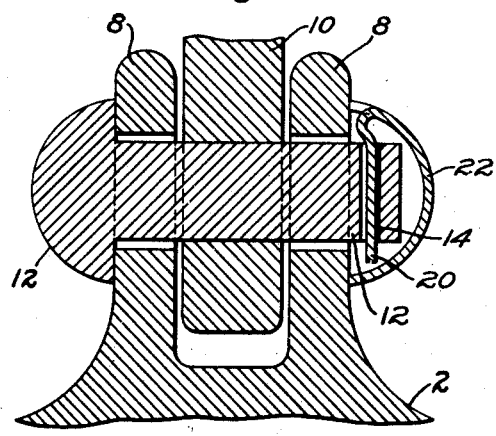
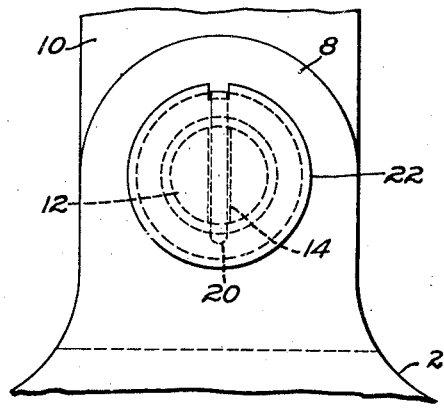
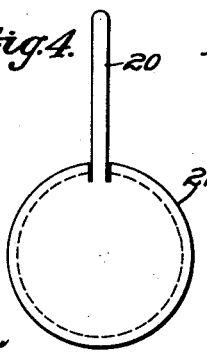
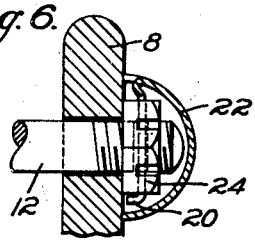
WITNESSES:
INVENTOR
George M. Barrow.
BY
ATTORNEY Patented Mar. 30, 1937

2,075,082

UNITED STATES PATENT OFFICE 2,075,082

COTTER DEVICE

George M. Barrow, Derry, Pa., assignor to Westinghouse Electric & Manufacturing Company, East Pittsburgh, Pa., a corporation of Pennsylvania Application September 18, 1934, Serial No. 744,526

2 Claims. (Cl. 173—318)

My invention relates to the hardware or fittings of transmission line supports and more particularly contemplates an improved form of cotter device for securing two of such parts in rotatable relation.

It is common practice in the art of transmission line supports such as suspension clamps, insulators, and other hardware associated with the transmission line, to secure cooperating parts in assembled relation by means of bolts retained in operative position by usual wire cotter-pins. In many cases the cotter-pin is the primary means for retaining the bolt in position, or it may be used to prevent a nut on the free end of the bolt from loosening or falling off under the influence of vibration.

On lines of high voltage, the proximity of the metallic fitting to the transmission line cable gives rise to a tendency for corona discharge from sharp parts of the fittings, and the tendency is particularly pronounced at the points of the usual wire cotter pins; a visible corona discharge frequently appearing at, and even below, the normal operating voltage of the line.

Accordingly, it is an object of the present invention to provide a cotter device wherein the tendency for corona discharge to develop is materially less than in the usual type of wire cotter-pin heretofore used.

In practicing the invention, I prefer to use a cotter-device having a pin or shank portion, adapted to extend through the usual transverse hole in a bolt, and having secured at one end thereof, preferably integrally, a portion of hemispherical shape which, when the pin is in position in the hole, can be bent down to enclose the pin as well as the end of the bolt with which it is associated.

Referring to the drawing,

Figure 1 is a view in elevation of a transmission line suspension insulator having the invention applied thereto, Fig. 2 is an enlarged view in section of a portion of the structure in Fig. 1 showing the detailed construction of the invention as practiced, Fig. 3 is a view in elevation taken at right angles to Fig. 2, Figs. 4 and 5 are views in front and side elevation, respectively, of the specific embodiment of the invention described herein before it is applied to a transmission line fitting, and Fig. 6 is a view partially in section of a modification of the invention.

Referring to Fig. 1, the transmission line fitting described herein purely by way of example, is an insulator comprising a body of porcelain provided with a metallic cap 2, a laterally extending creepage flange 4 and a depending metallic pin 6. The cap 2 is provided with apertured ears 8 adapted to cooperate with a similarly apertured support 10 through a bolt 12 to support the insulator.

The support 10 may be part of a transmission tower construction, or it may be the depending pin of the next higher insulator of a string.

The depending pin 6 may cooperate with a lower insulating unit, in the manner that the support 10 cooperates with the ears 8, or it may engage the ears of a clamping device which either directly or indirectly engages a transmission line conductor.

The foregoing construction is a common one and is related to the present invention only as one possible application for it. In this construction, as well as in the case of clamps and other hardware, bolts, such as 12, are maintained in operative position by means of a wire cotter-pin extending through the free end of the bolt. The cotter-pin is inserted through a suitable aperture in the bolt, such as 14 in Fig. 2, provided for that purpose, and the two legs are bent apart to maintain it in position in the well known manner. The ends of the legs are usually more or less pointed and corona discharge from these ends will occur at a low operating voltage of the associated transmission line.

Referring more specifically to Figs. 4 and 5, the cotter device of my invention comprises a blank of sheet metal having a shank or pin portion 20 and a hemispherical portion 22. As shown, these parts are integral and preferably formed in a single stamping operation. The point at which the pin portion 20 joins the cup portion is somewhat removed from the peripheral edge of the cup for a purpose hereinafter described.

In operation, the pin portion 20 of the device shown in Fig. 4 is inserted in the pin hole 14 in bolt 12 with the cup portion 22 facing outwardly. The cup portion then is bent down to the position shown in Fig. 2 so that the cup completely encloses the pin 20 and maintains the pin in operative position. Inasmuch as the pin portion joins the cup portion at a point removed from the peripheral edge of the latter, the edge of the cup when in operative position may abut the face of the ear 8, so that the pin, as well as the end of the bolt 10, is completely enclosed.

It will be noted that when the cotter device of my invention is in operative position, a smooth hemispherical exterior contour is provided which discourages the formation of corona and requires a relatively high voltage application before corona will occur.

It has been found by experiment that when the usual type of wire cotter-pin is employed, having the usual pair of bent points maintaining it in position, corona is evident at as low as 60 kv. On the other hand, when the present invention was tested under the same operating conditions, no corona was evident at 250 kv. The test was stopped at this point and the maximum kv. at which corona discharge would begin was not determined. It is evident, however, that by use of this invention a very marked improvement was obtained, thereby decreasing the line loss resulting from corona discharge and, what is of greater interest to the general public, decreasing the interference with radio reception resulting from such corona discharge.

Quite obviously, if found desirable under some conditions, the pin portion 20 may be split longitudinally as in the case of the usual cotter pin, or the lower end of the portion 20 may be bent longitudinally of the bolt 10, as in Fig. 6, to secure the pin in position. It has been found, however, that these expedients are usually unnecessary; the cup portion 22 being sufficient to maintain the pin in operative position.

In Fig. 6 the invention is illustrated as applied to a castellated nut 24 to prevent its removal under the influence of vibration. Here again the cup portion 22 encloses the end of the bolt 12, and in addition encloses the nut 24, to present a smooth hemispherical shield for these elements.

In the modifications thus far described, it has been assumed that the bolt 12 is of a usual type having a rounded semi-spherical head so that when the cotter device 20, 22 is applied to the free end of the bolt there are no sharp or angular points or areas to encourage the development of corona discharge. It is within the contemplated scope of the present invention, however, to use a headless bolt having an aperture such as 14 (Fig. 2) at each end thereof for receiving my improved cotter device, or a bolt having another shape of head suitably apertured to receive the pin 20 of the cotter device.

Further, although I have shown the invention applied to a conventional suspension insulator as one possible application for it, quite obviously, it is applicable to transmission line supporting clamps and all transmission line fittings and hardware where conventional wire cotter-pins are employed, or where a bolt, pin, or like device, or the means for maintaining it in position, is of a configuration to encourage corona development.

Obviously, other modifications may be made in the present invention without departing from the spirit and scope thereof, and it is desired, therefore, that no limitation shall be placed upon it except as imposed by the prior art and set forth in the appended claims.

I claim as my invention:

1. In combination with an electrical transmission line fitting including relatively movable elements and means for rotatably securing said elements together including a bolt having a rounded head portion and a transverse aperture through the remote end thereof, of means for maintaining said bolt in position comprising a pin proportioned to extend entirely through said aperture, and a body of cup shape integral with one end of said pin and enclosing the other end thereof and the remote end of said bolt for reducing the corona discharge from said pin and bolt end and for maintaining said pin in operative position.

2. In combination with an electrical transmission line fitting including relatively movable elements and means for rotatably securing said elements together including a bolt having a rounded head portion and a transverse aperture through the remote end thereof, of means for maintaining said bolt in position comprising a pin proportioned to extend entirely through said aperture, and a body of cup shape integral with one end of said pin and enclosing the other end thereof and the remote end of said bolt for reducing the corona discharge from said pin and bolt end and for maintaining said pin in operative position; said body of cup shape having a substantially spherical exterior surface.

GEORGE M. BARROW.